United States Patent
Troel (10) Patent No.: US 9,215,294 B2
(45) Date of Patent: Dec. 15, 2015

(54) MANAGEMENT OF COMMUNICATIONS BETWEEN A CLIENT EQUIPMENT AND A SERVER EQUIPMENT PROVIDING TO THE CLIENT EQUIPMENT COMPUTER RESOURCES REPRESENTED ACCORDING TO A FILE SYSTEM

(75) Inventor: Arnaud Troel, Le Mans (FR)

(73) Assignee: ST-ERICSSON SA, Plan-Les-Ouates (CH)

( * ) Notice: Subject to any disclaimer, the term of this patent is extended or adjusted under 35 U.S.C. 154(b) by 510 days.

(21) Appl. No.: 13/574,386

(22) PCT Filed: Feb. 2, 2011

(86) PCT No.: PCT/EP2011/051499
§ 371 (c)(1),
(2), (4) Date: Oct. 5, 2012

(87) PCT Pub. No.: WO2011/095527
PCT Pub. Date: Aug. 11, 2011

(65) Prior Publication Data
US 2013/0198262 A1      Aug. 1, 2013

(30) Foreign Application Priority Data
Feb. 4, 2010 (EP) .................................... 10305115

(51) Int. Cl.
*H04L 29/06* (2006.01)
*G06F 17/30* (2006.01)

(52) U.S. Cl.
CPC .......... *H04L 67/42* (2013.01); *G06F 17/30091* (2013.01)

(58) Field of Classification Search
CPC ..................... G06F 17/30091; G06F 17/30115

USPC .................................................. 709/203, 219
See application file for complete search history.

(56) References Cited

U.S. PATENT DOCUMENTS

| | | | |
|---|---|---|---|
| 5,367,671 A * | 11/1994 | Feigenbaum et al. | 1/1 |
| 5,909,540 A * | 6/1999 | Carter et al. | 714/4.4 |
| 6,122,631 A | 9/2000 | Berbec et al. | |
| 6,567,817 B1 * | 5/2003 | VanLeer | 1/1 |
| 7,814,131 B1 * | 10/2010 | Haynes et al. | 707/821 |
| 2003/0200412 A1 * | 10/2003 | Peinado et al. | 711/202 |

(Continued)

OTHER PUBLICATIONS

International Search Report issued in corresponding International application No. PCT/EP2011/051499, mailing date Apr. 26, 2011.

(Continued)

*Primary Examiner* — Brandon Renner
*Assistant Examiner* — Scott M Sciacca
(74) *Attorney, Agent, or Firm* — Patent Portfolio Builders PLLC (57) ABSTRACT

A method for managing communications between a server equipment and a client equipment, wherein the server equipment provides to the client equipment computer resources represented in the server equipment according to at least one file system, and upon receipt of a first request of the client equipment for access to a first resource dedicated to provide identifiers, the server equipment performs the following steps: —allocating a memory space for storing a data structure representing a file of the server, —determining an identifier based on an address of the allocated memory space, and—transmitting the determined identifier to the client equipment for use in later requests for accessing second resources of the server.

12 Claims, 6 Drawing Sheets

(56) References Cited

U.S. PATENT DOCUMENTS

2004/0078465 A1* 4/2004 Coates et al. ............... 709/226
2007/0005604 A1* 1/2007 Jain et al. .................... 707/10
2008/0301254 A1* 12/2008 Bestler ........................ 709/212
2009/0171971 A1 7/2009 Goddard et al.
2010/0205397 A1* 8/2010 Chellam ..................... 711/173
2014/0259123 A1* 9/2014 Haynes et al. ............... 726/4

OTHER PUBLICATIONS

Written Opinion of the International Searching Authority issued in corresponding International application No. PCT/EP2011/051499, mailing date Apr. 26, 2011.

Extended European Search Report issued in corresponding European application No. 10 30 5115.7, completion date Oct. 26, 2010.

* cited by examiner

MANAGEMENT OF COMMUNICATIONS BETWEEN A CLIENT EQUIPMENT AND A SERVER EQUIPMENT PROVIDING TO THE CLIENT EQUIPMENT COMPUTER RESOURCES REPRESENTED ACCORDING TO A FILE SYSTEM

TECHNICAL FIELD

The present invention relates to the management of communications between a client equipment and a server equipment providing to the client equipment computer resources represented according to a file system.

In particular, the present invention relates to improvements in the management of identifiers used for identifying the files of the file system in the messages sent by the client equipment during the communications.

BACKGROUND OF THE INVENTION

Complex computer systems are built by assembling sub-systems dedicated to few specific tasks.

For example, Mobile phones and more generally embedded devices concentrate a wide variety of features, such as wireless telecommunications, multimedia, autonomy or connectivity and they are massively based on heterogeneous multi-core architectures.

Distributing a system on several collaborating sub-sub-systems raises the issue of making them communicate with each other in an efficient manner. Several technologies have been built to address that issue from the software standpoint.

Recently, new distributed operating systems have been introduced which rely on client/server network protocols (such as the "9P" protocol) to access remote resources.

In these operating systems, computer resources are represented according to file systems. Files are envisaged in a synthetic manner. They do not only refer to data organized on a storage device. They may represent user interface windows, network connections or anything else, provided that what the file represents is manipulated using file operations such as "open", "read", "write", "close", etc. Accessing resources of a remote machine seamlessly comes to mounting the related remote file system into the local one, thanks to a dedicated distributed file-system.

PRIOR ART

Accessing resources in the above described servers is based on communications between the client and the server. Each communication comprises one request message issued by a client and its response message sent back by the server.

Each request from the client comprises an identifier for identifying the file representing the resources solicited. In the first request for access to a resource, the client gives both the name of the file (for example its path in the file system of the server (e.g. /proc/cpuinfo)), and the identifier it wishes to use for identifying the file in further communications. This identifier is at least a 32 bits word. Later on, messages related to the file will not carry its path. Instead, they will carry the identifier the client chose.

The use of identifiers enables preserving the bandwidth (4 bytes instead of a character string) during exchanges and the server computing resources (parsing a character string requires more processing than handling 32 bits words).

In the prior art, identifiers are chosen by the client, independently from the server. Hence, the server has to translate the identifier into its address of the internal memory representation of the file requested by the client using a lookup table. This translation (or lookup phase) is performed each time a request containing an identifier is received by the server.

The efficiency of the search operation depends on how the lookup table is implemented. Binary search trees based implementations have a search execution cost proportional to the logarithm of the number of stored elements (noted O(ln (n)) according to the Landau notation). Hash table based implementations efficiency directly depends on the underlying hashing function. A hashing function that would have a better performance than binary search trees is hard to define since no information on how the clients chose their identifiers is known a priori at the server. Sequences based implementations (linked lists, queues, etc.) lead to an execution cost directly proportional to the number of stored elements (O(n)).

Hence, the lookup phase is a big burden for the server. This is very penalizing in the field of embedded computing or mobile phones, which are environments where the server typically has low calculation capabilities, particularly when compared to its clients.

SUMMARY OF THE INVENTION

There is a need for an alternative to the lookup phase of the server that occurs when it handles client requests in order to save computation resources of the server.

To that purpose there is provided, according to a first aspect of the invention, a method for managing communications between a server equipment and a client equipment. The server equipment provides to the client equipment computer resources represented in the server equipment according to at least one file system. The server equipment is configured for receiving requests for access to the computer resources from the client equipment. The requests comprise an identifier for identifying a file of the system representing a computer resource requested for access. The server equipment comprises a first resource dedicated to provide to the client equipment identifiers for use in the later requests for accessing second resources of the server equipment. The method comprises the following steps performed by the server equipment upon receipt of a first request of the client equipment for access to the first resource dedicated to provide identifiers:

allocating a memory space for storing a data structure representing a file of the server, determining an identifier based on an address of the allocated memory space, and transmitting the determined identifier to the client equipment for use in later request for access to the second resources.

With the present method, the client may obtain identifiers from the server and use them in the further messages sent for accessing other resources. As the identifiers originate from the server, upon receipt of these request it may rapidly, and without performing heavy computing determinate to what file the identifiers refers to.

The present method is compatible with the communication management methods of the prior art wherein the client chooses itself the identifiers used in the communications. Hence, the implementation of the present method provides interoperability with the systems of the prior art, and then already existing systems may easily be reconfigured for implementing the present method without necessitating excessive development time and costs.

For example, the identifier returned directly corresponds to the address of the allocated memory space. Hence, when the server will receive a request message with the identifier, it will directly go to the memory space.

In order to avoid communicating memory addresses, which may lead to security breaches in the communication, the server may transmit identifiers only to trusted and authenticated client. For example, the client firstly authenticate before requesting identifiers.

In another example, the identifier is a position in an index storing the address of the allocated memory space. Hence, the address may be accessed instantaneously, and the identifier transmitted is not carrying information about the memory addresses of the server. This may avoid security breaches in the communication.

The identifier may also correspond to a key of a hash table. Contrary to the prior art, the implementation of a hash table is possible and offers good performance of search since the server can choose the identifier and so it may define a hash function that permits obtaining the address of the allocated memory space rapidly from the identifier.

Having the server providing to the client identifier enables not necessitating searching a lookup table (or binary search tree) for the correspondence between an identifier (chosen by the client) and the file associated.

With the present invention, there is no need for lookup table searches and the clients have to obtain identifiers from the server before accessing resources in order to accelerate their communications with the server.

The resource dedicated to providing to the client equipment identifiers may be represented according to a dedicated file system known a priori by the client equipment.

The client equipment may obtain the identifiers it will need for accessing the resources of the server. Also, as the server allocates memory spaces associated to the identifiers, when the client will require access to a file and will require associating to it an identifier, a memory space will be ready for storing the representation of the requested file.

Hence, communications during access of the resources are accelerated and require less computing from the server.

In applications wherein servers have limited computational capabilities, the present method enables maintaining good performances of the communications. Indeed, in the prior art, the communications between clients and server are not very optimized since the communications are managed based on the assumption that the server are machines having large computational capabilities, and that the machines are dimensioned for performing the searches in the lookup tables. Then, the communication management of the prior art are not adapted to systems wherein the server has limited computational capabilities.

The method may further comprise the following steps performed by the server equipment upon receipt of a second request of the client equipment for access to a file of a file system of the server, said request comprising an identifier previously determined by the server:

determining, based on the identifier, the address of the allocated memory space,     creating a data structure representing the root in said memory space.

Hence, when the client requests a resource, there is no need for the server to search in a lookup table because it may determine in an efficient manner to what file the identifier is related since the identifier originates from the server.

Also, when accessing the file and creating the data structure representing it, there is no memory allocation since the allocation has already been performed when the identifier has been provided to the client.

The method may further comprise the following steps performed by the server upon receipt of a third request of the client equipment for reading data of a file of the file system, said request comprising an identifier previously determined by the server:

determining based on the identifier the address of the allocated memory space, said memory space storing a representation of the file requested, and     reading the data of the file in the data structure.

Again, when reading a file of the file system, the server does not need searching a lookup table.

In embodiments of the invention, the address of the allocated memory space has a value greater or equal to 4096.

This enables making discrimination between identifiers provided by the server and identifiers chosen by the client. Indeed, the present method may be compatible with communications according to the prior art. The server, upon receipt of a message containing an identifier may detect whether the identifier originated from the client or the server. Depending on the result of the detection, it may search a lookup table for the correspondence of the identifier or apply the present method.

The value 4096 may be a criterion for discrimination since memory spaces below 4096 are in general not allocated by allocation modules because they are used internally.

There is also provided, according to a second aspect of the invention, a method for managing communications between a server equipment and a client equipment as briefly discussed above, comprising the following steps performed by the client equipment:

transmitting a first request to the server equipment for access to the resource dedicated to provide identifiers,     receiving from the server, an identifier determined by the client equipment for use in requests for access to resources of the server.

The method may further comprise the following steps performed by the client equipment:

transmitting to the server equipment a second request of the client equipment for access to a file of a file system of the server, said request comprising an identifier previously received from the server, and/or     transmitting to the server equipment a third request of the client equipment for reading data of a file of the file system of the server, said request comprising an identifier previously received from the server.

According to other aspects of the invention, there is also provided:

computer programs comprising instructions for executing a method according to the first and second aspects when the program is executed by a processor;

computer program products for storing the computer programs;

a server equipment and a client equipment configured for implementing methods according to the first and second aspect; and     a system comprising a client equipment and a server equipment communicating according a method according the first and second aspects.

These objects provide at least the same advantages as those associated to the methods.

Other advantages are obtained by additional features which are recited in the dependent claims attached hereto.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

Figure 1:
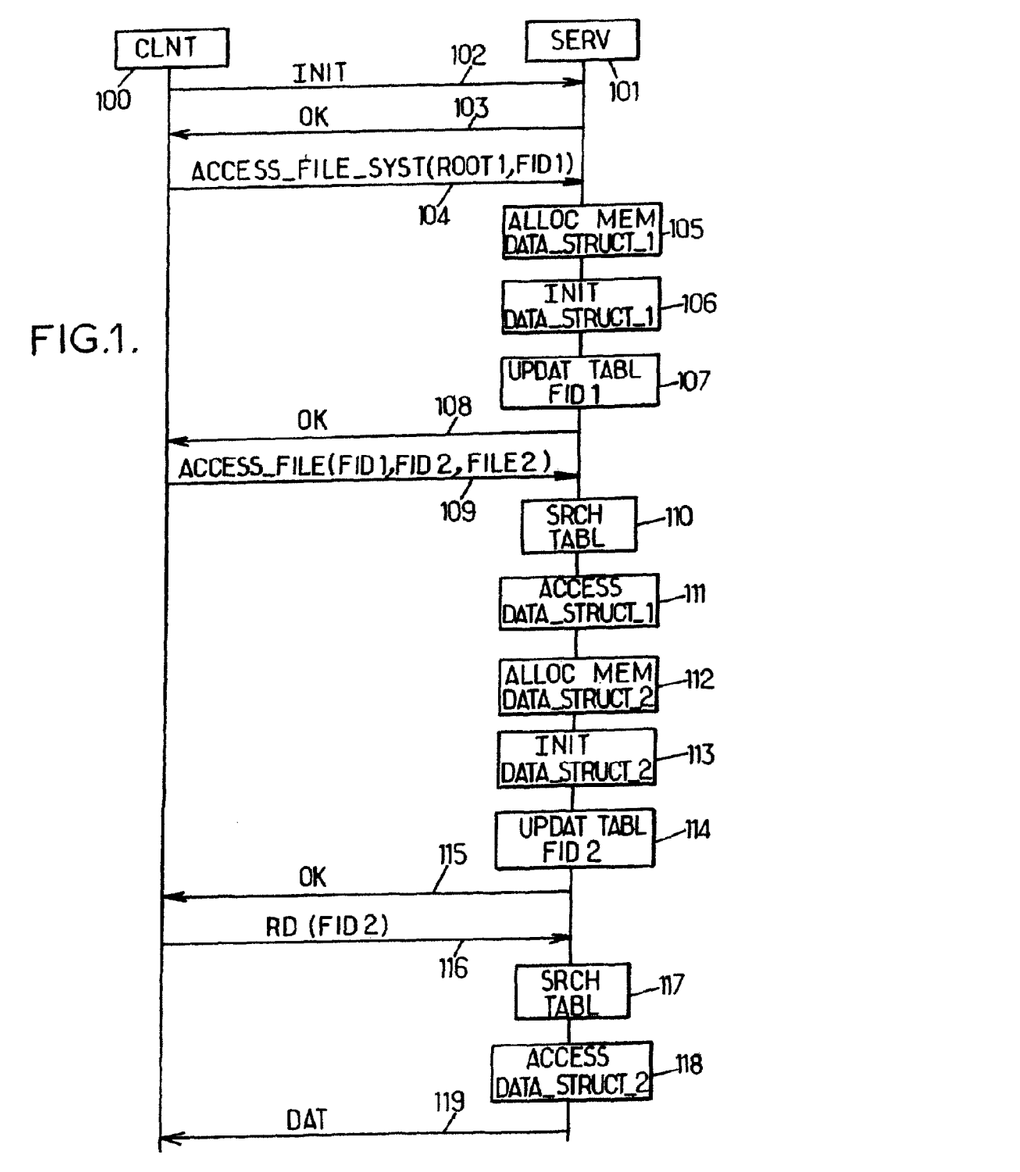
FIG. 1 is a schematic illustration of the management of a communication when identifiers are chosen by the client equipment.

First, with reference to FIG. 1, there is described a communication between a client equipment 100 and a server equipment 101, when identifiers are chosen by the client equipment.

The client equipment sends to the server equipment a connection message 102. For example, this message contains an identification of the version of the protocol used, a size of the messages that are going to be sent, or other indications. The server equipment then sends to the client equipment a response message 103. The response message may be an acknowledgement of the connection solicited. The response message may also be an indication that the version or the size specified are not compatible with the server equipment. In this case, the response message contains the version or the size accepted by the server equipment.

After, the exchange of messages 102 and 103, a communication is opened between the client and the server.

In order to access resources provided by the server, the client sends a message 104 to the server. This message corresponds to the mounting of an image of the root of a file system of the server. For example, resources of the server are accessible from a default file system. The message 104, comprises a name of the root of the default file systems, for example "ROOT1", and an identifier, for example "FID1", for informing the server that the root of the default file system will be referred to as FID1 in the further messages. The name ROOT1 may be a character string designating a name or a path known by the client for accessing the root of the default file system.

Upon receipt of message 104, the server allocates a memory space during step 105. This memory space will be used for storing a data structure (or container) representing the root of the default file system for the client. This, after step 105, an amount of memory is reserved to that purpose. Then, in step 106, the data structure representing the root of the default file system for the client is created and stored in the allocated memory space.

Then, the address of the allocated memory space and the identifier received from the client are associated in a lookup table during step 107. The lookup table may be a binary search tree that stores the identifiers provided by the client and associates memory addresses of the representation of the file identified by the identifier.

Then, the server returns a message 108 for indicating that the root of the default file system is accessed. For example, the message may comprise a description of the files contained in the root of the file system.

After the receipt of message 108, the client has access to the resources of the server that are represented according the default file system.

In order to access a particular resource, the client has to access (or open) a particular file of the file system. To that purpose, the client sends to the server a message 109. The message 109, is a message for passing from a current file of the file system to a desired file. It contains the identifier of the current file, here, the identifier FID1 of the root of the default file system, a name "FILE2" of the file requested for access (for example its path from the root of the file system), and a second identifier "FID2" for identifying file FILE2 in further messages.

Upon receipt of message 109, the server searches in the lookup table an entry for identifier FID1 during step 110. This step requires a lot of processing since the server has no information on the way the client chooses the identifiers and then it has to search the entire table for this entry. After step 110, the server found the memory address corresponding to identifier FID1 and accesses the data structure stored at this address during step 111.

The server also allocates a memory space in step 112. This memory space will be used to store the data structure representing the requested file FILE2 for the client. This data structure is created during step 113, by accessing the requested file FILE2 from the data structure representing the root of the default file system.

Then, the server updates the lookup table during step 114 for storing the association between identifier FID2 and the address of the allocated memory space storing the data structure representing the requested file FILE2.

Then, the server sends a message 115 to the client for informing that it has access to the requested resource (represented by file FILE2).

In order to use the resource, the client sends a message 116 for obtaining the data represented by the file previously accessed. The message contains the identifier FID2 of this file.

Upon receipt of the message, the server searches the lookup table for an entry of identifier FID2 during step 117 and gets (or reads) the data of the representation of the file stored at the memory address corresponding to the identifier FID2 in the lookup table during step 118.

The data are then transmitted to the client in message 119.

The communication may continue by obtaining other data from the file FILE2 or other files of the default data structure. The communication may also continue by accessing other file systems of the server, alternatively, the communication is stopped. The lookup table is progressively updated by inscription of new identifiers provided by the client, or by deletion of identifiers no longer used by the client. The identifiers may also be associated to new addresses.

The above described communication showed that for every access to a file, and each time a file is requested for a reading, the lookup table is searched. This searching step requires a lot of processing and then penalizes the server performance and the speed of the communication between the client and the server.

Figure 2A:
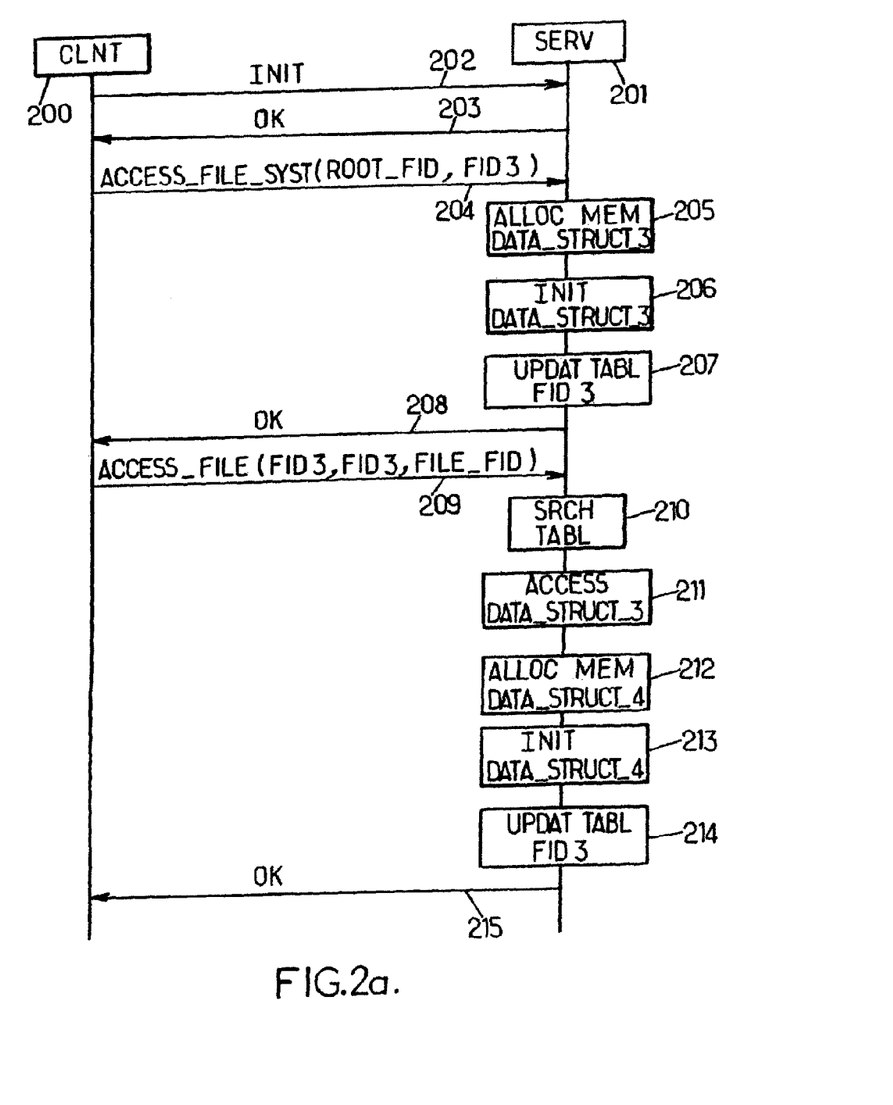
FIGS. 2a, 2b and 2c schematically illustrate a communication according to an embodiment of the invention.

A communication between a client equipment 200 and a server equipment 201 according to an embodiment of the invention is described with reference to FIGS. 2a, 2b and 2c.

In this embodiment, the server has a resource dedicated to providing to the client identifiers to be used in its messages for access to other resources of the server. This resource is represented according to a particular file system having a root named ROOT_FID which is supposed to be known by the client.

During a first process, the client accesses the resource dedicated to providing identifiers, using the method described with reference to FIG. 1. The identifiers used in the messages of the client originate from the client and are stored in a lookup table.

During a second process, the client accesses other resources of the server, using the identifiers obtained during the first process.

The first process is described with reference to FIGS. 2a and 2b.

The communication is initiated by the transmission of message 202 from the client and the transmission of the response message 203 from the server. These messages are analogous to messages 102 and 103 of FIG. 1.

The client then accesses the file system representing the resource dedicated to providing the identifiers of the server. To that purpose, the client sends to the server a message 204 comprising the name of the root ROOT_FID of the file system, and an identifier FID3 for identifying this root in the further messages.

Upon receipt of the message 204, the server allocates a memory space in step 205, creates in the memory space a data structure representing the root of the data structure in step 206, and updates the lookup table by associating the identifier FID3 to the address of the memory space allocated for storing the data structure. The server then returns a message 208 for confirming that the root has been accessed.

The client then accesses a file of the file system representing the resource providing the identifiers. To that purpose, it transmits a message 209 that comprises the identifier FID3, and the name FILE_FID of the file requested for access. The message also comprises another identifier for identifying the FILE_FID file. In this example, the other identifier is FID3. Hence, FID3, after the root has been accessed will be used for identifying the file FILE_FID.

Upon receipt of the message 209, the server searches the table for the entry FID3 (step 210), then it accesses the data structure stored at the memory address associated to FID3 in the table (step 211). The server also allocates a memory space during step 212, for storing a data structure representing the file FILE_FID created in step 213. The table is then updated by replacing the address associated to FID3 by the address of the memory space allocated in step 212. After this step, identifier FID3 identifies the file FILE_FID. The server then sends a message 215 to inform the client that it has access to the file FILE_FID. The client may now obtain identifiers from the server.

Figure 2B:
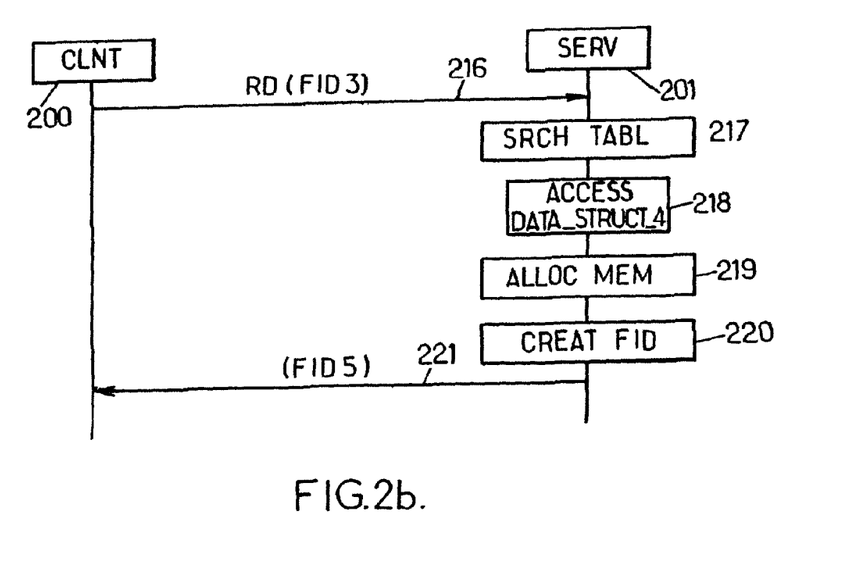
Figure 2C:
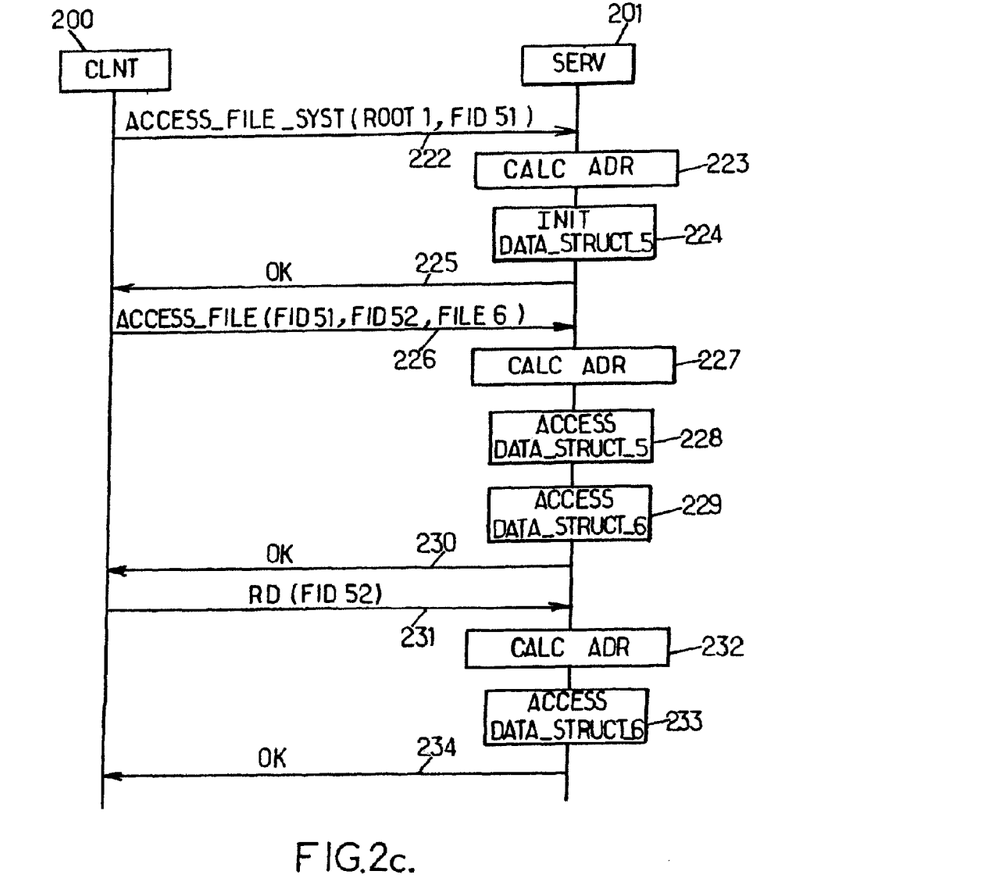

With reference to FIG. 2b, in order to obtain an identifier, the client sends a message 216 comprising identifier FID3. Then, the server searches the table in step 217 for an entry of identifier FID3, and accesses the data structure of the corresponding file in step 218.

Then, the server allocates a memory space in step 219, and creates an identifier based on the address of the allocated memory space in step 220. The server then returns the created identifier in message 221.

For example, the identifier created corresponds directly to the address of the allocated memory space. Hence, when the server will receive this identifier in a message of the client, it will directly have access to the allocated memory space.

In another example, in step 221, the address of the allocated memory space is stored in an index. Such an index may be scanned very easily and rapidly for recovering the address.

In step 221, the identifier may be calculated using an invertible mathematical function that enables calculating back the address of the allocated memory space directly and rapidly from the identifier. This may be used for not transmitting to clients the memory addresses of the memory space of the server, and then informing them on the structure of the memory of the server. Indeed, letting clients know about the memory structure may open security breaches in the communication.

When the identifier identically corresponds to the address of the allocated memory space, an authentication step may be added in order to authorize only identified and authorized clients to have access to the resource providing identifiers.

The second process is described with reference to FIG. 2c.

During the present process, the client 200 requests to the server access to a resource represented by a file system. For example, it accesses the file system having the root named ROOT1. To that purpose, it sends a message 222 containing the name ROOT1 of the root of the file system, and an identifier FID51 received through a message 221 as described with reference to FIG. 2a. Hence, the identifier used originated from the server and directly or indirectly corresponds to a memory address of a memory space already allocated by the server, without need of a lookup table to retrieve the address.

Upon receipt of the message 22, the server determines, in step 223, the memory address associated to identifier FID51. For example, identifier FID52 directly represents a memory address and the server only recognizes the address. Alternatively, the identifier corresponds to a value of an index where the address is stored. Then, the server initializes a data structure representing the root ROOT1 in the memory space at the memory address corresponding to the identifier. Hence, the server does not perform all the operations of the data structure creation of the prior art at once (i.e. memory allocation and initialization), since the allocation of memory has already been done. After this initialization step, identifier FID51 leads to the representation of the root ROOT1. Then, the server returns a message 225 for informing the client that the root of the file system has been accessed.

Then, the client requests access to a file of the file system by sending a request 226 comprising the identifier FID51, the name FILE6 of the file requested for access, and another identifier FID52 for identifying the file FILE6 once it will have been accessed. This identifier FID52 has been obtained in the same way identifier FID51 was.

Upon receipt of the message 226, the server determines in step 227 the memory addresses corresponding to the identifiers FID52 and FID51, then the server accesses, in step 228, the data structure stored in the memory space at the address corresponding to FID51 (which is the data structure representing the root ROOT1), and then initializes in step 229 a data structure representing file FILE6 of the file system in the memory space at the address corresponding to the identifier FID52. The server then returns a message 230 for informing the client that the file FILE6 has been accessed.

Then, the data comprised in file FILE6 may be read by the client using a message 231 comprising the identifier FID 52. Upon receipt of the message, the server determines in step 232 the address corresponding to the identifier FID52, and then accesses the data structure stored in the memory space at the memory address determined. The server then returns the data of the file in a message 234.

Hence, in the process according to the present embodiment, for accessing resources of the server, there has been no need for searching a lookup table for translating the identifiers provided by the client (except for the first process for retrieving the identifiers). Indeed, the fact that the identifiers have been previously been determined by the server enables a raid determination of the address of the memory space storing the data structure representing the files. Also, now, each identifier corresponds to a pre allocated memory space. Hence, the allocation step is no longer part of the access to the resources of the server (except the resource dedicated to providing the identifiers).

In the present process, the computation capabilities of the server have been saved.

In the above, the communications between the client and the server have been described in general terms, without referring to a specific protocol. However, the person with ordinary skill in the art will be able to select appropriate message types of a protocol for implementing the embodiments.

For example, if the protocol implemented is the "9P" protocol:

messages 102, and 202 may be Tversion messages, and messages 103 and 203 may be Rversion messages;

messages 104, 204 and 222 may be Tattach messages, and messages 108, 208, and 225 may be Rattach messages;

messages 109, 209, and 226 may be Twalk messages and messages 115, 215, and 230 may be Rwalk messages; and messages 116, 216, and 231 may be Tread messages, and 119, 221, and 234 may be Rread messages.

The present invention is not limited to that protocol.

Figure 3A:
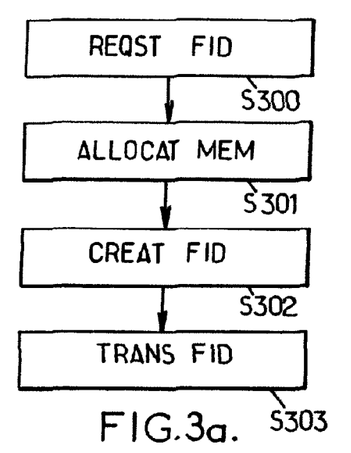
FIGS. 3a, 3b and 3c are flowcharts summarizing steps of a method according to embodiments of the invention.
Figure 3B:
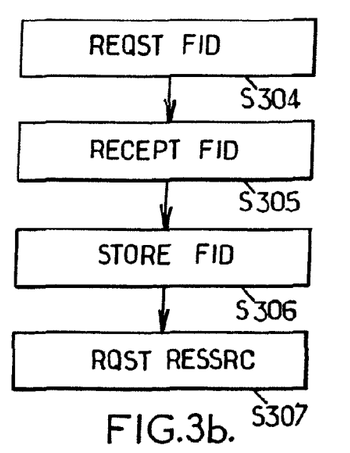
Figure 3C:
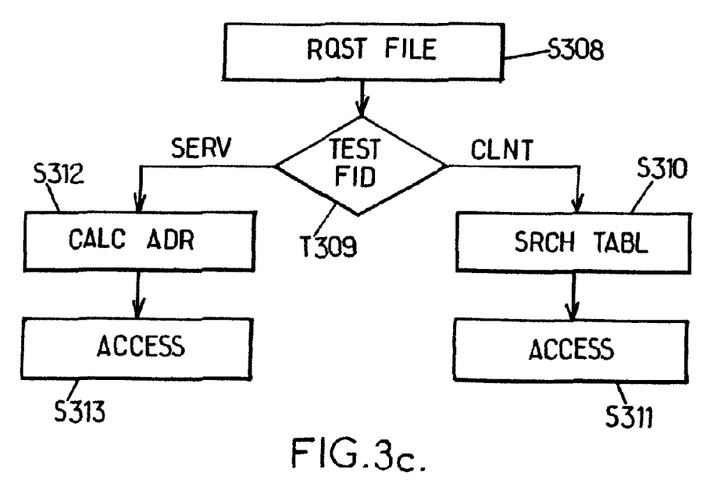

FIGS. 3a, 3b, and 3c are general flowcharts that summarize steps performed according to an embodiment.

FIG. 3a summarizes the steps performed by a server equipment for providing a client with an identifier.

In step S300, the server receives a request for an identifier. Then, the server allocates a memory space in step S301. The server then creates an identifier in step S302, based on the address of the allocated memory space. For example, the identifier directly corresponds to the address of the allocated memory space. The identifier may also be a position in an index storing addresses of allocated memory spaces. Other implementations enabling a fast recovery of the address starting from the identifier may be envisaged as it will be apparent to the person with ordinary skill in the art. Then, the server returns the identifier to the client in step S303.

FIG. 3b summarizes steps performed by a client equipment for receiving an identifier and for accessing a resource using the received identifier.

In step S304 the client sends a request for obtaining an identifier from the server. For example, as described above, the client first accesses a file system dedicated to provide identifiers and then reads a file containing identifiers.

Then, the client receives an identifier from the server in step S305 and stores it in a memory in step S306.

Then, when the client uses the stored identifier in a message sent in step S307 for accessing a file of the server, it stores the association between the file and the identifier. Then, in further messages, the client will use the identifier for referring to the file.

FIG. 3c summarizes steps performed by the server equipment when receiving a request for access to a resource.

In step S308, the server receives a request for access to a resource of the server, comprising an identifier.

In step S309, the server determines if the identifier originates from the client or if it has previously been determined by the server.

For example, the server may send to the client identifiers the value of which is greater or equal to 4096 and the client chooses identifiers having a value less than 4096 (which means that when the identifier sent has not previously been received from the server, the identifier is chosen to be less than 4096. Hence, if the identifier in the request is less than 4096, the server concludes that the identifier originates from the client, and if the identifier in the request is greater or equal to 4096, the server concludes that the identifier originates from the server.

In case the identifier originates from the client (for example it is less than 4096), the server searches the lookup table in step S310 for the address corresponding to the identifier. Then, the server accesses the corresponding resource at the address retrieved from the lookup table.

In case the identifier originates from the server (for example it is greater or equal to 4096) the server determines in step S312 the address associated to the identifier. This step does not involve a search in the lookup table. The identifier may directly correspond to the address, or to a position in an index storing the address. Then it accesses the resource in step S313 as already described.

A computer program comprising instructions for executing the steps of the method described above may be designed based on an algorithm derived from the general flowcharts depicted in FIGS. 3a, 3b, and 3c and the present description.

Figure 4A:
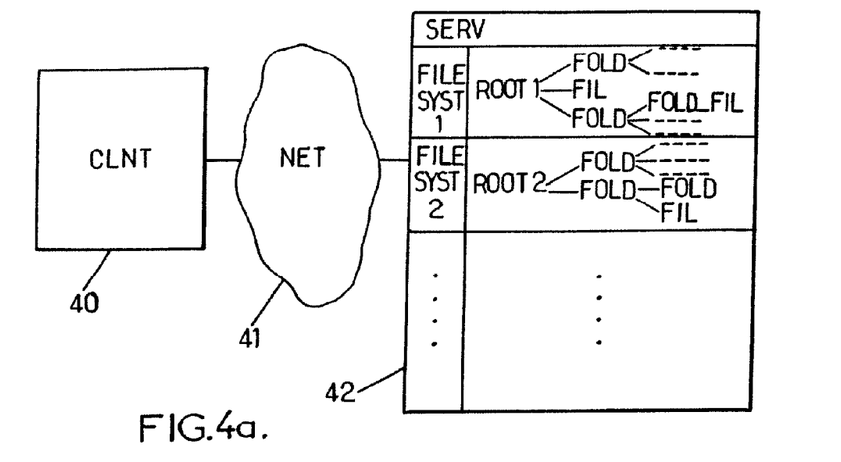
FIGS. 4a, 4b, and 4c schematically illustrate a system, a client equipment and a server equipment according to embodiments of the present invention.
Figures 4B, 4C:
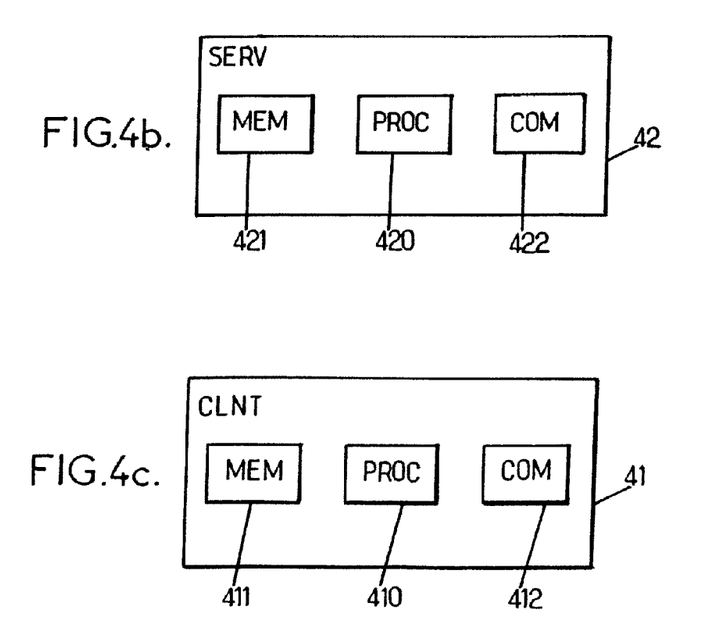

Referring to FIGS. 4a, 4b, and 4c, a server equipment and a client equipment according to an embodiment of the present invention are described. A system according the embodiment comprises a client equipment 40 which communicates with the server equipment 42 through a network 41.

The client equipment and the server equipment may be subsystems of a mobile telecommunication terminal. The network may correspond to a set of communication buses of the terminal. For example, the client and the server communicate according to the 9P protocol. Of course, this is a non limiting example, and the invention has other implementation that will be apparent to the person with ordinary skill in the art.

The server comprises a processing unit 420 for implementing a method according to embodiments of the invention. To that purpose, the server comprises a memory unit 421. The memory unit may comprise several types of memory. For example, the memory unit may comprise a memory for storing processing data. The memory unit may also comprise a memory for storing a computer program according to embodiments of the invention. Also, the memory unit may store one or several file systems. One file system may be dedicated to providing computer resources to the client, and another file system may be dedicated to provide identifiers to the client. The server further comprises a communication unit 422 for performing communications over the network.

The client equipment comprises a processing unit 410 for implementing a method according to embodiments of the invention. To that purpose, the client comprises a memory unit 411. The memory unit may comprise several types of memory. For example, the memory unit may comprise a memory for storing processing data. The memory unit may also comprise a memory for storing a computer program according to embodiments of the invention. The client further comprises a communication unit 412 for performing communications over the network.

While the invention has been illustrated and described in details in the drawings and foregoing description, such illustration and description are to be considered illustrative and exemplary only, the invention being not restricted to the disclosed embodiments. Other variations to the disclosed embodiments can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method for managing communications between a server equipment and a client equipment:
said server equipment providing to the client equipment computer resources represented in the server equipment according to at least one file system;
said server equipment being configured for receiving requests for access to the computer resources from the client equipment, the requests comprising an identifier identifying a file of the file system representing a computer resource to which access is requested;
the server equipment comprising a first resource represented in said server equipment according to a first file system, said first resource being dedicated to provide to the client equipment identifiers for use in requests for accessing second resources of said server equipment;
the method comprising the following steps performed by the server equipment,
upon receipt of a first request from the client equipment for access to the first resource, the first request comprising a first identifier determined by the client equipment, said first identifier identifying said first resource,
allocating a first memory space for storing a data structure representing the first resource, and
associating said first identifier to an address of the allocated first memory space;
upon receipt of a second request from the client equipment for obtaining a second identifier from the first resource, said second request comprising the first identifier, said first identifier identifying a file of a second file system of the server equipment,
allocating a second memory space for storing a data structure representing the file of the second file system of the server equipment,
determining, by the server, the second identifier based on an address of the allocated second memory space, wherein the second identifier comprises a direct address of the second memory space, an index of a table storing the address of the second memory space or a key of a hash table, and
transmitting the determined second identifier to the client equipment for use in the requests for accessing the second resources of the server equipment;
upon receipt of a third request of the client equipment for reading data of a file of the file system, said request comprising the second identifier,
determining, based on the second identifier, the address of the allocated second memory space, said second memory space storing a representation of the file requested, and
reading the data of the file in the data structure.

2. The method according to claim 1, further comprising the following steps performed by the server equipment upon receipt of a fourth request of the client equipment for access to a file of the second file system of the server, said fourth request comprising the second identifier:
determining, based on the second identifier, the address of the allocated second memory space, and
creating a data structure representing the file in said second memory space.

3. The method according to claim 1, wherein the address of the allocated second memory space has a value greater or equal to 4096.

4. A non-transitory computer-readable medium having stored thereon a computer program comprising instructions for implementing the steps of a method according to claim 1 when loaded and run on computer means of a server equipment.

5. A server equipment comprising:
a communication unit for communicating with a client equipment;
a processing unit for managing communications with the client equipment; and
wherein the processing unit is configured for managing the communications according to claim 1.

6. A method for managing communications between a server equipment and a client equipment:
said server equipment providing to the client equipment computer resources represented in the server equipment according to at least one file system,
said server equipment being configured for receiving requests for access to the computer resources from the client equipment, the requests comprising an identifier for identifying a file of the file system representing a computer resource requested for access,
the server equipment comprising a first resource represented in said server equipment according to a first file system, said first resource being dedicated to provide to the client equipment identifiers for use in requests for accessing second resources of said server equipment;
the method comprising the following steps performed by the client equipment,
transmitting a first request to the server equipment for access to a first resource dedicated to provide to the client equipment identifiers, the first request comprising a first identifier determined by the client equipment, said first identifier being configured to identify the first resource dedicated to provide identifier,
transmitting a second request for obtaining a second identifier from the first resource dedicated to provide to the client equipment identifiers, said second request comprising said first identifier determined by the client equipment, said first identifier being configured to identify a file of a second file system of the server equipment,
receiving from the server, a second identifier determined by the server for use in the requests for accessing the second resources of the server equipment, wherein the second identifier comprises a direct address of the second memory space, an index of a table storing the address of the second memory space or a key of a hash table,
transmitting to the server equipment a third request of the client equipment for reading data of a file of the second file system, said third request comprising the second identifier; and
receiving data of the file of the second file system from the server equipment.

7. The method according to claim 6, further comprising the following steps performed by the client equipment upon receipt of the second identifier:
transmitting to the server equipment a fourth request for access to a file of a the second file system of the server, said request comprising the second identifier.

8. A non-transitory computer-readable medium having stored thereon a computer program comprising instructions for implementing the steps of a method according to claim 6 when loaded and run on computer means of a client equipment.

9. A client equipment comprising:
a communication unit for communicating with a server equipment;

a processing unit for managing communications with the server equipment; and wherein the processing unit is configured for managing the communications according to claim 6.

10. A system comprising a client equipment and a server equipment:

said server equipment is configured to provide to the client equipment computer resources represented in the server equipment according to at least one file system;

said server equipment is further configured to receive requests for access to the computer resources from the client equipment, the requests comprising an identifier configured to identify a file of the system representing a computer resource requested for access;

wherein the server equipment comprises a first resource represented in the server equipment according to a first file system, said first resource is dedicated to provide to the client equipment identifiers for use in the requests for accessing second resources of the server equipment;

wherein the client equipment is configured to transmit a first request to the server equipment for access to the first resource dedicated to provide identifiers, the first request comprising a first identifier determined by the client equipment, the first identifier is configured to identify the first resource dedicated to provide identifiers;

wherein upon receipt of the first request of the client equipment, the server equipment is configured to, allocate a first memory space configured to store a data structure, and associate the first identifier to an address of the allocated first memory space;

wherein upon association of the first identifier to the address of the allocated memory space, the client equipment is further configured to transmit a second request to the server equipment for obtaining a second identifier from the first resource dedicated to provide identifiers, the second request comprising the first identifier determined by the client equipment;

wherein upon receipt of the second request of the client equipment, the server equipment is further configured to, allocate a second memory space configured to store a data structure representing a file of a second file system of the server equipment, determine a second identifier based on an address of the allocated second memory space, wherein the second identifier comprises a direct address of the second memory space, an index of a table storing the address of the second memory space or a key of a hash table, and transmit the determined second identifier to the client equipment for use in the requests for accessing the second resources of the server equipment;

upon receipt a third request of the client equipment for reading data of a file of the file system, the third request comprising the second identifier, the server equipment is further configured to, determine, based on the second identifier, the address of the allocated second memory space, the second memory space storing a representation of said file requested, and read the data of said file in the data structure.

11. The system of claim 10, wherein upon receipt of the second identifier, the client equipment is further configured to transmit a fourth request to the server equipment for access to a file of the second file system of the server equipment representing a second resource, the fourth request comprising the second identifier.

12. The system of claim 10, wherein the address of the allocated second memory space has a value greater or equal to 4096.

* * * * *